Figure 6:
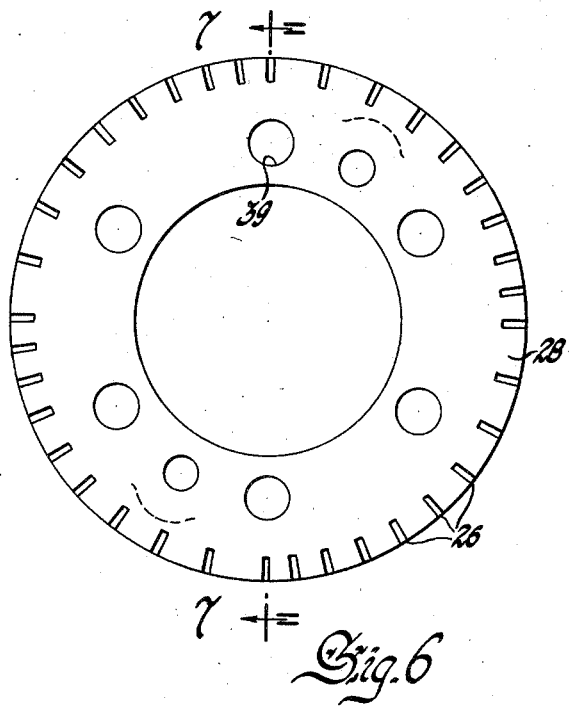

March 19, 1957
R. W. STAPLETON
2,785,636
FLUID COUPLING
Filed Dec. 28, 1953
2 Sheets-Sheet 1
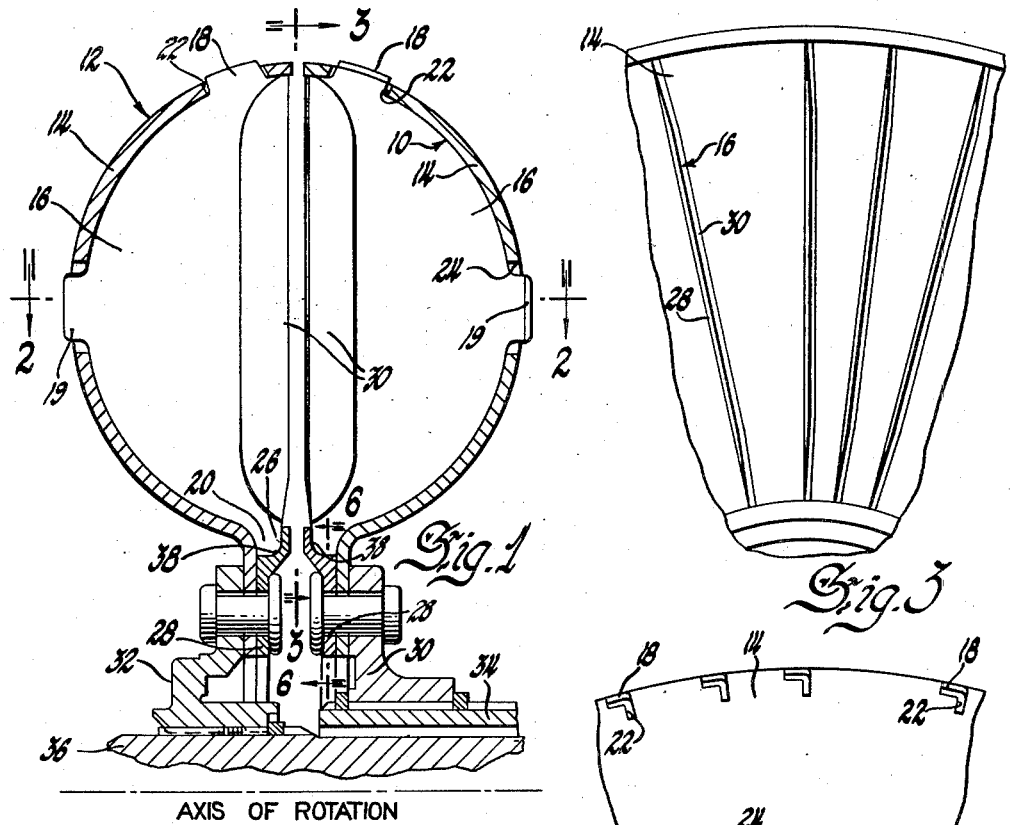
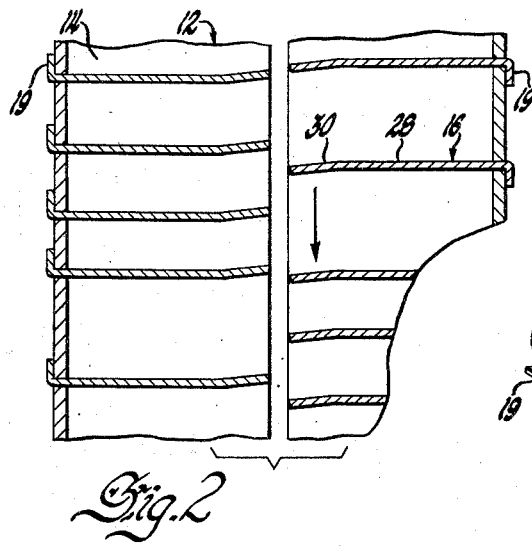
INVENTOR
Robert William Stapleton
BY
T. L. Chisholm
ATTORNEY March 19, 1957 R. W. STAPLETON 2,785,636
FLUID COUPLING Filed Dec. 28, 1953 2 Sheets-Sheet 2

INVENTOR
Robert William Stapleton
BY
T. L. Chisholm
ATTORNEY

United States Patent Office 2,785,636
Patented Mar. 19, 1957

2,785,636

FLUID COUPLING

Robert William Stapleton, Birmingham, Mich., assignor to General Motors Corporation, Detroit, Mich., a corporation of Delaware Application December 28, 1953, Serial No. 400,400

1 Claim. (Cl. 103—115)

This invention relates to an improved hydrokinetic torque transferring device generally known as fluid coupling, of the general type shown in the Thompson Patent 2,357,295, September 5, 1944.

It is among the objects of the invention to simplify and reduce the cost of manufacture of such couplings, to increase the torque capacity of couplings of a given size, and to construct the parts of a coupling so that couplings of varying torque capacities can be easily assembled in mass production from a single size and style of each of a group of major parts.

Figure 7:
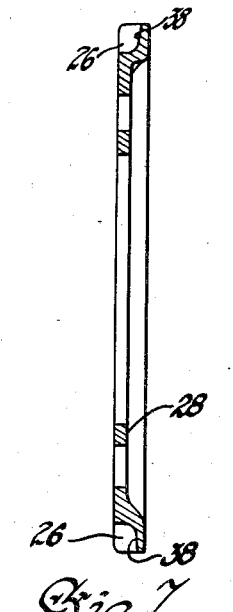

In the drawings:

Fig. 1 is one half of a symmetrical axial section of a coupling embodying one form of the invention, Fig. 2 is a fragmentary section on the line 2—2 of Fig. 1, the arrow indicating the direction of rotation, Fig. 3 is a fragmentary elevation of one of the rotors of the coupling as seen from the line 3—3 of Fig. 1 in the direction of the arrows, Fig. 4 is a fragmentary elevation of the rotor of Fig. 3, as seen from the right of Fig. 1, Fig. 5 is a perspective of a vane embodying one form of the invention, Fig. 6 is an elevation of a retaining ring as seen from the line 3—3 of Fig. 1 in the direction opposite the arrows, and Fig. 7 is a section of the retaining ring on the line 7—7 of Fig. 6.

The invention applies to a fluid coupling, which as shown in said Thompson patent has two facing ring-shaped rotors, each including a shell of the general shape of half of a torus. The shape of the shell may be generated by revolving a semi-circular line about the axis of rotation of the coupling.

As is customary the impeller 10 and turbine 12 are similar, in fact identical except for the details of their connections to supporting and driving shafts. Each has a toroidal shell 14 and a plurality of transverse generally flat vanes or blades 16, stamped from sheet metal and disposed principally or approximately in a plane determined by the axis of rotation and a line perpendicular to the axis. I call this a radial-axial plane. So much is common practice.

In this invention each blade is secured to the shells by supporting tabs disposed in a radial axial plane, but the blade is formed or disposed at least in part in a surface intersecting the radial axial plane. The portion disposed at an angle to the axial plane directs the liquid in a tangential direction when it leaves the shell which forms the impeller or when it enters the shell which forms the driven member. This transverse or tangential component of fluid flow, if in the direction of rotation of the impeller, increases the torque capacity of a given coupling.

Each blade is supported in the shell by projections or tabs 18, 19 and 20 placed between the shoulders formed by the sides of slots 22, 24 and 26 respectively, all of said slots being in the same radial axial plane. The preferred way of forming the blade into a shape having a tangential component is to bend the blade near its straight edge to incline the portion near the edge in the tangential direction as shown best in Figs. 2 and 5. This provides an area 28 disposed in a radial axial plane, and an area 30 lying in a surface (preferably a plane) intersecting the radial axial plane. This permits a three dimension vane to be formed of flat stock and to be secured in a standard shell having a two-dimension support disposed wholly in one radial axial plane. This greatly reduces the cost of manufacture of the shells, which can be slotted by a simple radial slotter (either saw or punch), reduces inventory and hence reduces the overall cost of the coupling.

Bending the portion 30 to different angles changes the torque capacity of the coupling, which has the advantage that couplings of varying capacities can be assembled from identical shells merely by selecting appropriately formed vanes.

The portions 30 can be formed in the direction of rotation of the pump to increase torque capacity or against the direction of rotation to decrease torque capacity. When the shells are assembled face to face the bend, if in the direction of rotation of the pump, is against the direction of rotation of the turbine (see Fig. 2).

The slots 22 and 24 are formed in the shell while the slots 26, which receive the tabs 20 are formed in a ring 28 (Figs. 6 and 7) which is riveted to the hub 30 or 32 by which the rotor is secured to the driving shaft 34 or driven shaft 36 respectively. Preferably the ring 28 is die cast and each slot 26 is closed at one axial end 38 as seen in Fig. 7. When the rotor is assembled the tabs 18 and 19 of each vane are inserted in the slots in the shell, the ring 28 is assembled over the tabs 20, the ring is riveted to the hub and the projecting tabs 18 and 19 are bent over as shown in Fig. 4. This provides a simple way of anchoring the tabs, particularly anchoring the projections both axially and radially.

I claim:

In a fluid coupling a generally ring-shaped rotor having an open side and adapted to be rotated about an axis which passes through the center of the ring to direct the flow of liquid along radial-axial planes through the rotor, a plurality of insertable vanes in said rotor, each vane including a portion lying in a radial-axial plane of said ring and having an edge corresponding to the cross-section of the ring and a generally straight edge disposed extending across the open side of the ring and disposed adjacent and parallel to the radial-axial plane containing said portion, each vane having a tab adjacent each end of the generally straight edge and at least one tab disposed along the edge corresponding to the cross-section and between the two first-mentioned tabs, all of said tabs being located in the radial-axial plane containing said portion, and each tab being disposed in a slot in the ring, and the vane having a second portion along said straight edge inclined to said radial-axial plane.

References Cited in the file of this patent

UNITED STATES PATENTS

| 1,784,212 | Walker | Dec. 9, 1930 |
| 2,179,519 | Popper | Nov. 14, 1939 |
| 2,381,187 | Swift | Aug. 7, 1945 |
| 2,429,503 | Zeidler | Oct. 21, 1947 |
| 2,628,509 | Pique | Feb. 17, 1953 |
| 2,660,957 | Koskinen | Dec. 1, 1953 |